United States Patent [19]
Hughes

[11] Patent Number: 5,736,977
[45] Date of Patent: Apr. 7, 1998

[54] VIDEO REAL ESTATE INFORMATION SERVICE

[75] Inventor: Robert Lee Hughes, Rowlett, Tex.

[73] Assignee: E-Systems, Inc., Dallas, Tex.

[21] Appl. No.: 427,847

[22] Filed: Apr. 26, 1995

[51] Int. Cl.⁶ .................................... G09B 3/00
[52] U.S. Cl. .................................... 345/326
[58] Field of Search .................... 395/152, 154, 395/155, 161; 345/156, 326, 329, 333, 334, 473

[56] References Cited

U.S. PATENT DOCUMENTS

| | | | |
|---|---|---|---|
| 4,510,594 | 4/1985 | Johnson | 370/15 |
| 4,567,595 | 1/1986 | Hedlund | 371/49.1 |
| 4,577,314 | 3/1986 | Chu, et al. | 370/60 |
| 4,642,755 | 2/1987 | Hinch | 395/416 |
| 4,709,418 | 11/1987 | Fox et al. | 359/118 |
| 4,734,765 | 3/1988 | Okada et al. | 345/194 |
| 4,763,317 | 8/1988 | Lehman, et al. | 370/60 |
| 4,949,248 | 8/1990 | Caro | 395/200.09 |
| 5,027,290 | 6/1991 | Kirk, et al. | 395/154 |
| 5,072,442 | 12/1991 | Todd | 370/62 |
| 5,099,510 | 3/1992 | Blinken et al. | 379/202 |
| 5,181,106 | 1/1993 | Sutherland | 359/164 |
| 5,184,345 | 2/1993 | Sahni | 370/54 |
| 5,260,778 | 11/1993 | Kauffman et al. | 348/6 |
| 5,310,349 | 5/1994 | Daniels et al. | 395/161 |

*Primary Examiner*—Phu K. Nguyen
*Assistant Examiner*—Cliff N. Vo
*Attorney, Agent, or Firm*—Harold E. Meier

[57] ABSTRACT

Apparatus and a method for providing real estate agents, persons relocating to another home or acquiring an interest in a property, and providers of home insurance, with an audio-visual presentation of a property supplied over existing cable, telephone, ISDN or other types of broadband network facilities. The audio-visual presentation is mode on a computer monitor from a database containing a visual walkthrough and a textual description of the property and surrounding areas.

13 Claims, 3 Drawing Sheets

VIDEO REAL ESTATE INFORMATION SERVICE

TECHNICAL FIELD

This invention relates to combining images with other information of real estate presented on the same screen, storing and filing all the information centrally or locally, and providing the combined information over a communications network.

BACKGROUND OF THE INVENTION

Presently, potential purchasers of real estate begin their search for a new home or property by contacting a real estate agent and describing to the real estate agent some criteria regarding the property that the buyer wants. The real estate agent responds by describing properties listed with that particular agent's office that generally meet the buyer's criteria. Unfortunately, an oral description cannot completely inform the client about the neighborhood, or what the property "feels" like. Typically, the real estate agent and the potential purchaser of a property select a small number of properties meeting the purchaser's requirements, and then drive together to several properties, often taking a great deal of time. Many clients tire of this viewing after just a few visits. Also, due to inadequate description by the client or to misunderstanding by the agent, the agent might not have a clear idea of what the client wants; and so the client might not have a chance to see some of the most appropriate properties. Furthermore, many clients, upon seeing the properties in the price range or otherwise meeting the criteria that they have outlined to the real estate agent, alter their requirements, necessitating a return to the real estate office to look at more photographs.

Because of the distances involved, a client wishing to relocate to another city generally must fly to the destination city weeks in advance and scout out a location, a task that often requires driving around in a strange city under stringent time constraints.

Other approaches to selling or buying a property include listing the property in a newspaper or posting a notice in various locations around the city in which the property is located. But these methods are haphazard: the buyer might miss a particular advertisement in a newspaper or not look through the newspaper that day, or might never see the posted notice. They are also severely restricted in geographical circulation, and may have time limitations as well.

Another approach is the use of a computer listing service. Like other computer matching services, computer listing services often provide buyers and sellers with questionnaires, and then use a computer to pair buyers with sellers. Unfortunately, because a computer is performing the selection, both parties are limited to the literal meaning of their responses to questionnaires. Furthermore, the services provide only a textual description of the property, usually without a picture, and the information provided by these services is limited to the seller's opinion of the property, rather than any objective presentation.

SUMMARY OF THE INVENTION

The present invention overcomes the foregoing and other problems by providing an apparatus and a method for conveying video images in a manner that gives the client the "feel" of visiting a property for sale or lease without actually visiting the property. The invention provides a client with a great deal of information regarding the property and the surrounding neighborhood in a concise, easily understood format and enables the client to select properties from a database storing information in the real estate agent's file, quickly and at the client's leisure, without having to visit the property. This allows clients and agents to spend far less time driving and viewing properties, and further allows clients to view properties that may be of only slight interest. It also allows clients to "experience" walking through properties in distant geographic areas or other cities without the time and expense of travel.

The invention is equally applicable in the commercial real estate field, and would be as useful to renters as to buyers of real estate. Apartment complexes and real estate developers, would also benefit from the opportunities to communicate with potential customers in such a convenient manner.

According to one aspect of the invention, video images of portions of a property are combined with other information, including text descriptions of each room and a floor plan of the property on a single display screen in a manner to create a "feel" of a walk through the property. One area of the screen, or one window, presents a video image of what the client would see if the client were walking through the property, while another area of the display screen (window) shows a floor plan of the entire property and indicates the room being shown in the video image. The client is able to stop and replay images, obtain more detailed information about the property or office space, or skip to other properties. Audio descriptions are also available to provide both verbal descriptions and other sounds that help the viewer "experience" a simulated visit.

In accordance with the another aspect of the invention a central regional office maintains files containing video images and associated data and makes the files available for playing via a network or modem connections. The central office may also maintain regional information, including area maps showing property, schools, shopping areas, and other points of interest, as well as a detailed floor plan and descriptive text.

Also, in accordance with the invention, a method of gathering and combining data regarding a property is disclosed, wherein information is gathered, edited and stored in such a way that it may be accessed, processed, and transmitted quickly and accurately. A "walking tour" of the property may be simulated. The viewer can stop the tour at any point and obtain more detailed information about particular rooms, and can simulate moving about the property. In one possible embodiment of this invention, the data is stored in a central office according to the variety of real estate, so that industrial real estate is maintained separately from residential apartments, for example. In another embodiment of the invention, files are also maintained on communities and cities, so that a potential buyer of real estate might learn about schools, shopping centers, commuter routes, and points of interest near the site of the property.

BRIEF DESCRIPTION OF THE DRAWINGS

For a more complete. understanding of the present invention and the advantages thereof, reference is now made to the following Detailed Description taken in conjunction with the accompanying Drawings in which.

DETAILED DESCRIPTION OF THE DRAWINGS

Figure 1:
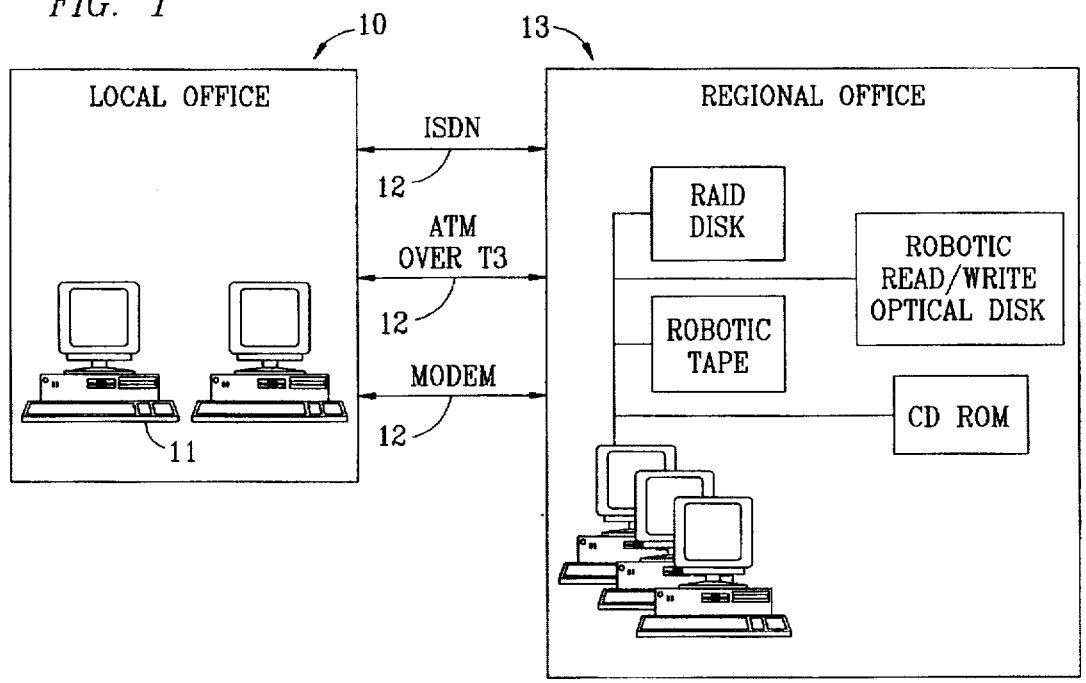
FIG. 1 is a diagram of a data storage facility and a network for delivering video images from a regional office to a local office.

Referring to FIG. 1, a local office 10 has a computer 11, for example a personal computer or workstation, and is located either in the real estate agent's office or, in the case of a lap-top computer, that is carried to a client's property or office. A network 12 connects the computer 11 to a regional office 13, where encoded information regarding the properties for sale or lease is stored and cross-referenced. This information includes a digitized version of a videotape made by a camera carried through the property, a detailed textual description of each room of the property, a description of the neighborhood, and a floor plan of the property. It may also include a digitized audio signal, giving a verbal description of the property, perhaps accompanied by other sounds, presenting the property in an attractive light. According to one aspect of the invention, the network is capable of transmitting data of this kind quickly and accurately. This aspect allows various local offices to show the same property to many clients, simply by connecting to a regional office where the information regarding the property is stored. By using a network, the real estate seller has a much broader customer base, since any local office in the country can connect to the network and show the property. One aspect of the invention uses a hierarchial network, with a local office as a node connecting to both the Regional Office and to the local real estate agents. The local office is connected by land telephone lines, cable, ISDN, or other types of broadband connection to a Wide Area Network over which the video images and audio data are transmitted, although the invention is not limited to these means of data transmission. The regional office stores the images of the video walkthroughs and data relating thereto on a digital storage device, possibly a Raid Disk, Robotic Tape, Read/Write Optical Disk, or a CD-ROM. In other embodiments, CD-ROM's or other storage devices may be sent to local offices, or satellite transmission may be practicable. These video signals are accompanied by data. This connectivity may find new network capabilities as the information superhighway develops.

Figure 2:
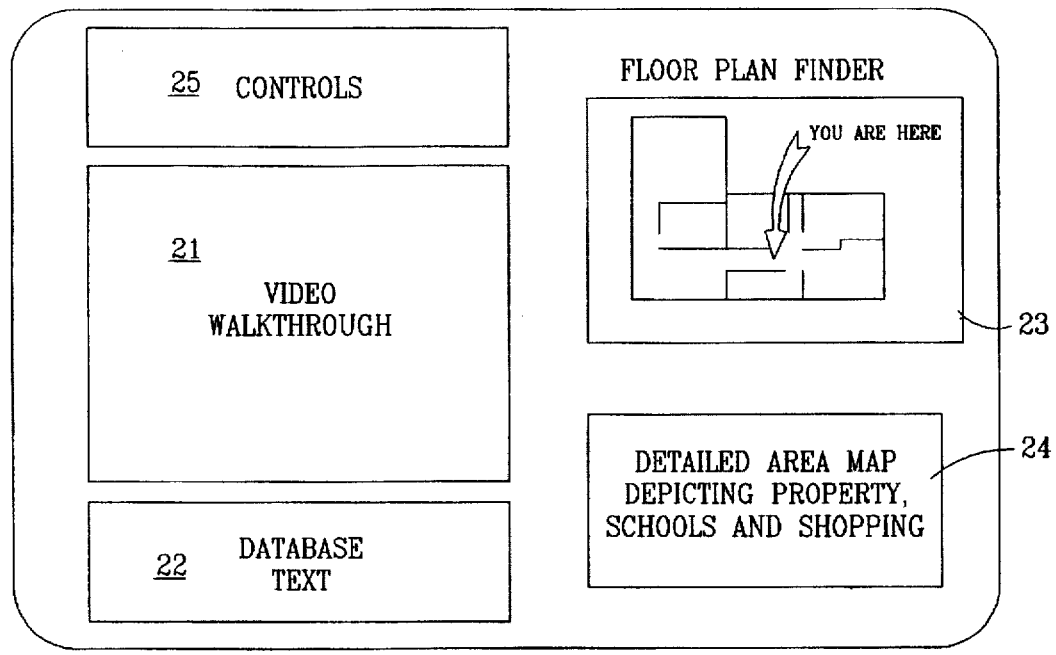
FIG. 2 is a typical display in one embodiment.

Referring to FIG. 2, the encoded information for the properties is displayed on a monitor. One aspect of this display is shown in FIG. 2, representing items of information simultaneously in a format easily understood by a real estate agent or client. This display appears on the screen of the computer 11. A video image made by a camera that has been carried through the property is shown in the center window 21 and may be manipulated by the user, who can stop, zoom, reverse, slow, and perform other operations on the image. Below this is a test window 22 which provides a text description of the room being shown in the center window 21, and gives detailed information on features of the location. Descriptions of the room are included. Also shown in FIG. 2 is a floor plan window 23 for displaying a floor plan of the property and indicating where the images are being taken. The display also includes an information window 24 to inform the user of the neighborhood and surrounding area, including points of interest, such as property, schools, and shopping. A control window 25 along the top of the display allows the user to input control commands.

Figure 3:
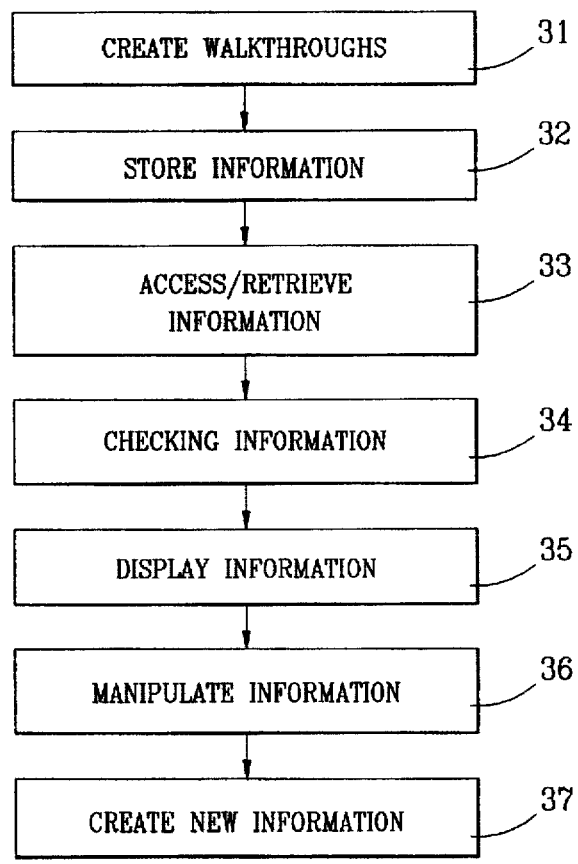
FIG. 3 is a flowchart representing the steps in creating and modifying a walkthrough of a property.

Referring now to FIG. 3, there is shown a flowchart diagram of one embodiment of a high level process of the present invention. A video walkthrough is created and digitized during sequence 31. Additional textual information is added in digital form, and all information is stored in sequence 32 at a regional office. From any local office connected by a communication network to the regional office, the digital information may be accessed during sequence 33 from a local office. This information may contain the video walkthrough of a property with each room and area separately indexed, a textual description of each room and area within the property, a floor plan of the property, map of the neighborhood or town, textual description of some features of the neighborhood or town, control information relating to the local office computer or the regional office computer, and/or other information. As various types of data are processed for simultaneous presentation to the user at the local office, a check is made to make sure the area being shown in the video is the same as the area being described in the text displays; the indices are compared in sequence 34. The information is displayed during sequence 35 to the user, who may enter commands during sequence 36 to the computers, allowing the user to change, during sequence 37, the data and imagine of the property.

Figure 4:
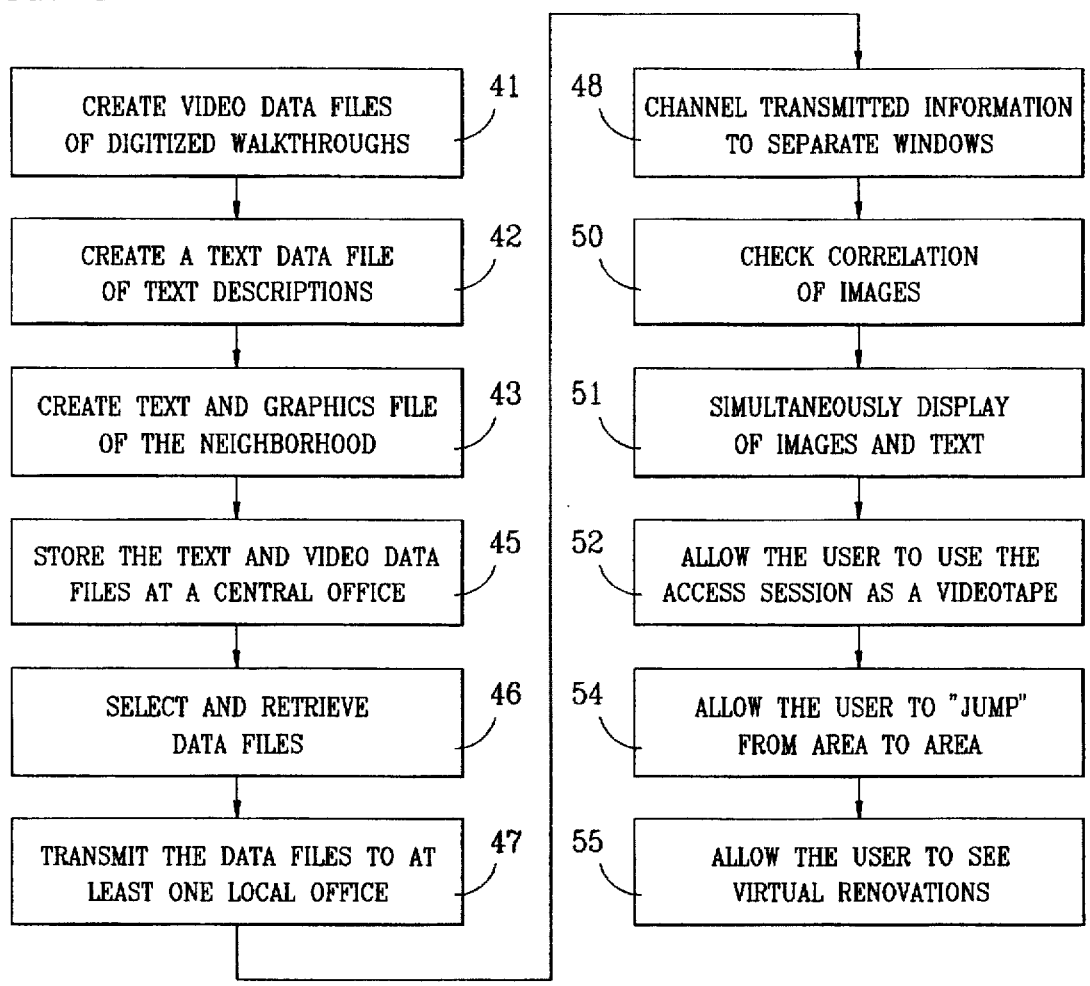
FIG. 4 is a flowchart representing a preferred embodiment of the invention including creating a property presentation, storing the presentation, and displaying the presentation to a customer.

Referring now to FIG. 4, a videotape is made of a piece of residential or commercial real estate to produce a 30 to 60 second long segment showing the real estate in an attractive light, and then the videotape is digitized in step 41; alternately, an all-digital video recorder may be used. Someone familiar with the real estate then enters during sequence 42 textual descriptions of various areas shown in the video walkthrough, associating each description with the corresponding segments of video. The surrounding neighborhood, including schools, nearby shopping centers or commuter routes, may also be included during sequence 43. In some situations, a map of the surrounding area may also be included during sequence 43. All the digitized video information is transmitted and stored in a regional office during a sequence 45, including a file containing textual descriptions of the real estate, its various areas and its surroundings. Computers may be used in conjunction with the storage devices to aid storage and retrieval of the digitized video and text information. In the preferred embodiment of the invention, storage devices and remote computers are located at one or more regional offices, although distributed networks among one or more local offices may be used to share the storage and retrieval activities. The video and text information thus stored is accessible by users at any local office by means of communication lines connecting the local offices with the regional office and/or with each other. Thus, the video walkthrough and text information of a piece of property may be selected during sequence 46 by a user who is a client of the service provider, and the digital information is transmitted by a sequence 47 to the local office on demand. The information is processed locally, where it is distributed to the display of FIG. 2 during a sequence 48. In some cases, it may be necessary to check, during a sequence 50, the correlation of the information being sent to the various displays (windows). In at least one window in the display, video is shown during a sequence 51 to the user, while in at least one other window text relating to the video informs the user during the same sequence 51. The user may interact during a sequence 52 with the computer at the local office as easily as one might use a VCR, fast-forwarding and rewinding, pausing and zooming to see various areas in the property more closely. The user may select during a sequence 54 particular rooms or other areas in the property from a floor-plan, and the interactive display responds by moving to the point in the presentation indicated by the user's selection. An additional feature is the ability to manipulate during a sequence 55 the data to show what the property would look like should alterations be made; clients who intend to paint the walls, buy new furniture or add on a new wing to a property can see what the property would look like before committing themselves.

Figure 5:
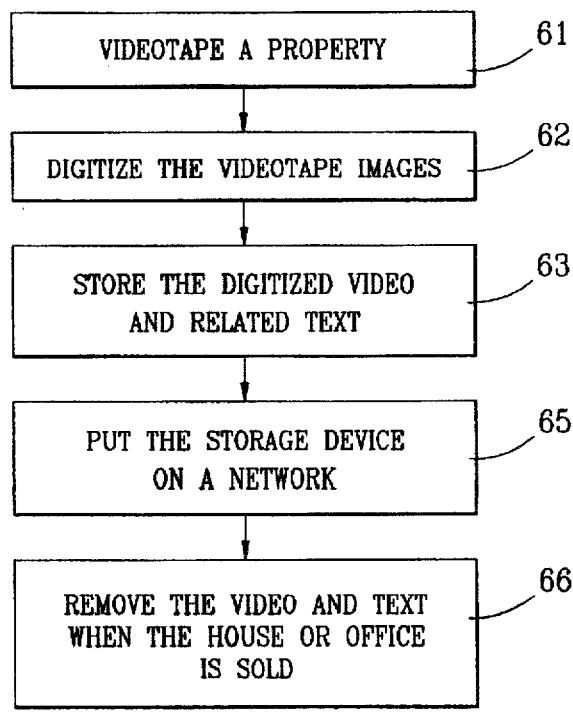
FIG. 5 is a flowchart of one embodiment for creating walkthroughs.

Referring now to FIG. 5, there is shown a preferred embodiment of a sequence for creating walkthroughs. Any of the following steps may be performed by the owner, the owner's real estate agent, or an independent contractor, or any other person with access to the property and an interest in facilitating the sale or rental of the property. A person with access to the property videotapes the property during sequence 61 every feature that might be attractive to a potential buyer/renter. This videotape image is digitized during a sequence 62. A verbal description of the property is made by someone familiar with the property, and this description along with the digitized video images are input at step 63 into a computer or data storage device. The stored information is made available to a communication network during sequence 65 including one or more local offices. When the property is no longer on the market, the information relating to that property may be deleted at step 66 from the storage device.

The invention is equally applicable in the commercial real estate field, and would be as useful to renters as to buyers of real estate. Apartment complexes and real estate developers would also benefit from the opportunities to communicate with potential customers in such a convenient manner.

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A method for storing, viewing, and manipulating descriptions and visual images of commercial or residential real estate, comprising the steps of:

generating a plurality of digitized video images of selected real estate, each digitized video image depicting a view of a specified area of a real estate property with two or more of the digitized video images sequentially arranged to simulate a visual walkthrough of the property;

generating a verbal description of the features and characteristics for each area within and surrounding the real estate;

storing the digitized video images and the verbal descriptions in a computer data base;

displaying on a single display of a computer monitor the sequential digitized video images;

presenting the verbal descriptions simultaneously with the display of the digitized video images; and manipulation by a user the verbal descriptions and the digitized video images to simulate a visual walkthrough.

2. The method set forth as in claim 1, further comprising the steps of:

manipulating the digitized video images of a selected area of a real estate property to integrate actual or contemplated renovations and alterations into the property;

creating new digitized video images depicting the renovations and alterations for the selected area; and displaying the new digitized video images depicting the renovations and alterations.

3. The method as set forth in claim 1, wherein the verbal descriptions comprise textual descriptions, and further comprising the step of displaying the textual descriptions on the display of the computer monitor simultaneously with the digitized video images.

4. The method as set forth in claim 3, further comprising the steps of:

generating a text data file comprising descriptions of areas within and surrounding the real estate;

storing the text data file, the digitized video images, and the textual descriptions in a computer data base at a regional office; and transmitting the text data file, the textual description, and the digitized video images relating to a specific real estate property from the regional office to at least one local office.

5. The method as set forth in claim 1, wherein the verbal descriptions comprise audio descriptions.

6. Apparatus for previewing selected commercial or residential real estate to enable a user to interact with stored information relating to a particular real estate property, comprising:

means for selecting and retrieving stored video images of a real estate property, the property comprising a plurality of areas in a spatial relationship, wherein each video image shows a specific view of one of the plurality of areas with each area depicted in one or more of the images;

means for simultaneously displaying the video images of one of the plurality of areas and a textual description relating to the displayed area; and means for inputting instructions to modify the displayed images for a user to interact with the display.

7. A display terminal for previewing a selected real estate property, the display terminal including a display screen having at least four windows, comprising:

a first window, for showing images of the selected real estate property from the perspective of a person walking through the property, each image depicting a substantially accurate view of a specific area within or surrounding the property;

a second window for showing a floor plan of the property and indicating the room showing on the first window;

a third window for showing a textual description of the room showing on the second window; and a fourth window for showing available input commands; and means for inputting commands to select for display particular areas in and around the property.

8. A method for controlling at a remote computer terminal information for selected real estate received from a computer database at a regional office, comprising the steps of:

converting information relating to the selected real estate that has been transmitted from the regional office into separate images to be shown on a plurality of windows of a display terminal of the remote computer terminal;

coordinating the separate images to establish an interdependence between the images shown on the plurality of windows;

displaying the images in the windows on the display terminal, wherein at least one of the plurality of windows displays images comprising substantially accurate views of areas within or surrounding the selected real estate; and stopping, continuing, pausing, reversing direction, speeding up, or slowing down the rate information is shown on the plurality of windows in response to commands received from a user.

9. The method as set forth in claim 8, wherein at least one of the plurality of windows displays images of textual information describing areas within or surrounding the selected real estate.

10. The method as set forth in claim 8, wherein at least one of the plurality of windows displays an image of the floor plan of the property and indicates the area described or depicted in another one of the plurality of windows.

11. A method for enabling a person to visually experience a walkthrough of a real estate property, comprising the steps of:

selecting a property from a computer database having stored information on a plurality of properties;

retrieving image and textual data for the selected property from the computer database, the image data including information for generating substantially accurate displays of a plurality of views of different areas within and surrounding the property and the textual data including information for generating descriptions of the areas within and surrounding the property;

displaying a visual representation of said image and textual data on a computer monitor;

inputting data from a user at the computer monitor for manipulating the image display; and altering the image data based on the input data input by the user.

12. A method for creating a walkthrough of a selected real estate property, comprising the steps of:

recording videotape images of the selected property;

generating a textual description of the selected property;

digitizing the textual description and videotape images;

storing the digitized textual description and videotape images in a computer memory;

composing a textual description of a room or rooms of the selected property;

composing additional textual information relating to the selected property; and accessing the computer memory to retrieve information pertaining to the selected property.

13. The method as set forth in claim 12, further including the steps of:

creating in a text file in the computer memory a description of the surrounding neighborhood; and, creating in a graphic file in the computer memory one or more images of the area surrounding the selected property.

* * * * *